(No Model.)

E. E. EUCHENHOFER.
CANDY MOLD.

No. 459,700. Patented Sept. 15, 1891.

Witnesses
C. W. Miles
George Ashton

Inventor
Edward E. Euchenhofer
By his Attorneys Wood & Boyd

UNITED STATES PATENT OFFICE.

EDWARD E. EUCHENHOFER, OF DAYTON, OHIO, ASSIGNOR OF TWO-THIRDS TO CHRISTIAN J. WEINMAN AND SAMUEL E. BALL, OF SAME PLACE.

CANDY-MOLD.

SPECIFICATION forming part of Letters Patent No. 459,700, dated September 15, 1891.

Application filed June 9, 1891. Serial No. 395,687. (No model.)

*To all whom it may concern:*

Be it known that I, EDWARD E. EUCHENHOFER, a citizen of the United States, and a resident of Dayton, in the county of Montgomery and State of Ohio, have invented certain new and useful Improvements in Candy-Molds, of which the following is a specification.

My invention relates to a flexible mold preferably made of rubber.

The object of my invention is to provide a mold primarily for use in making cream or foudant candies, or it may be used for any analogous purpose. In the use of such molds they are apt to become heated. I provide means for cooling the molds.

Another difficulty in the use of rubber molds for candies is that in bending the molds the forms are apt to break or tear. My invention obviates this difficulty in a large degree.

The various features of my invention are fully set forth in the description of the accompanying drawings, making a part of this specification, in which—

Figure 1:
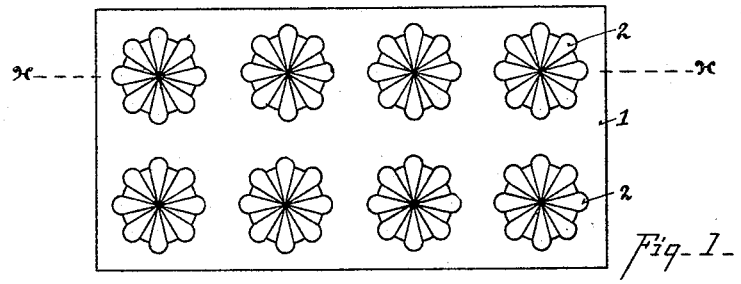
Figure 2:
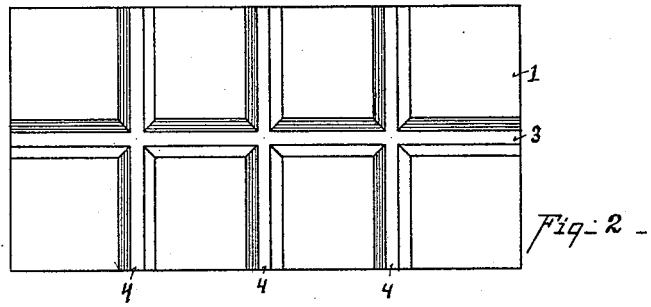
Figure 3:
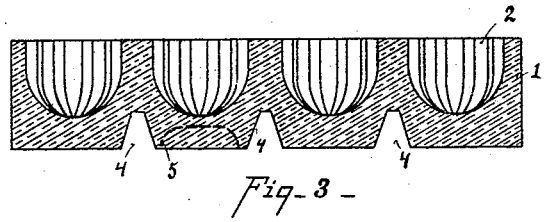

Figure 1 is a plan view of the mold containing a series of cells. Fig. 2 is a plan view of the bottom of the mold shown in Fig. 1. Fig. 3 is a section on line *x x*, Fig. 1.

1 represents a sheet of rubber of the desired thickness to form a mold.

2 represents cavities or indentations into which the fluid or plastic material is poured to give the desired configuration.

3 represents a series of recesses or grooves formed in the under side of the sheet, and preferably between the cavities 2.

4 represents another series of grooves running at right angles to the former series and preferably between the right-angle sets of cavities. The series of grooves 3 perform two offices. First, they allow the rubber to bend for discharging the material from the cavities. This bending stretches the upper portion of the cavities and allows the material to readily drop out. These recesses allow the bending to be easily accomplished and without danger of undue stretching the rubber upon the upper side. These recesses likewise allow for the circulation of air or cold-water currents through them and keep the mold cool. When the molds are used too frequently, they become heated, which renders them difficult to handle and prevents the candy setting, and the circulation of water or air through the recesses 3 will effectually obviate this. To increase the efficiency of cooling, the right-angle series of recesses 4 are provided. Molds made in this way can be used more rapidly, and at the same time they last much longer, as they do not become unduly heated.

Another advantage claimed is that the molds are lighter in weight, being easier to handle, and cheaper in cost.

In Fig. 3 I have shown a modification by line 5, which shows a recess directly under the cavities, which may be used in lieu of the other form; but it is the equivalent of the recess 3 herein shown.

By forming the mold with air or water circulating passages in one side and the mold-cavities in the opposite sides I not only provide for cooling and bending the mold, but avoid splitting or dividing the walls of the mold-cavities, as heretofore.

Having described my invention, what I claim is—

1. An elastic rubber candy-mold having air or water circulating grooves formed in one surface and mold-cavities for the candy formed in the opposite surface, substantially as and for the purposes described.

2. An elastic rubber candy-mold having mold-cavities formed in one surface and two series of air or water circulating grooves formed in the opposite surface and extending at right angles to each other, substantially as and for the purposes described.

In testimony whereof I have hereunto set my hand.

EDWARD E. EUCHENHOFER.

Witnesses:
 T. SIMMONS,
 C. W. MILES.